United States Patent [19]

Martinez

[11] Patent Number: 4,707,812
[45] Date of Patent: Nov. 17, 1987

[54] METHOD OF SUPPRESSING VIBRATION SEISMIC SIGNAL CORRELATION NOISE

[75] Inventor: David R. Martinez, Plano, Tex.

[73] Assignee: Atlantic Richfield Company, Plano, Tex.

[21] Appl. No.: 806,442

[22] Filed: Dec. 9, 1985

[51] Int. Cl.$^4$ ............................................. G01V 1/00
[52] U.S. Cl. ....................................... 367/46; 367/41; 367/49
[58] Field of Search ..................... 367/41, 46, 49, 190, 367/44

[56] References Cited

U.S. PATENT DOCUMENTS

| | | | |
|---|---|---|---|
| 3,332,511 | 7/1967 | Silverman | 367/41 |
| 3,671,932 | 6/1972 | Holzman | 367/49 |
| 3,885,225 | 5/1975 | Anstey | 367/41 |
| 3,984,805 | 10/1976 | Silverman | 367/190 |
| 4,034,333 | 7/1977 | Cunningham | 367/41 X |
| 4,159,463 | 6/1979 | Silverman | 367/59 |
| 4,168,485 | 9/1979 | Payton | 367/41 |

OTHER PUBLICATIONS

"Non-Linear Vibrator Sweeps", Geophysics: The Leading Edge of Exploration, Dec. 1985.
"Simultaneous Recording of Several Vibroseis Lines" Robert Garotta, 1983, 53rd Seg. Meeting, Las Vegas.

*Primary Examiner*—Thomas H. Tarcza
*Assistant Examiner*—Tod R. Swann
*Attorney, Agent, or Firm*—James C. Fails; F. Lindsey Scott

[57] ABSTRACT

A method of seismic prospecting in which there is employed conventional upsweep and downsweep and opposed polarity of signals that are being sent into the earth as seismic signals and in which there is introduced a taper at the common frequency at the common time on the respective upsweep and downsweep signals to reduce the most significant part of the correlation noise, yet provide the advantages of each of the methods of using opposite phase polarity, to cancel and using opposite upsweep and downsweep to achieve reduction in the noise experienced, as well as the reduction of the most significant part of the correlation noise that distorts the desired zero-phase Klauder wavelet.

5 Claims, 19 Drawing Figures

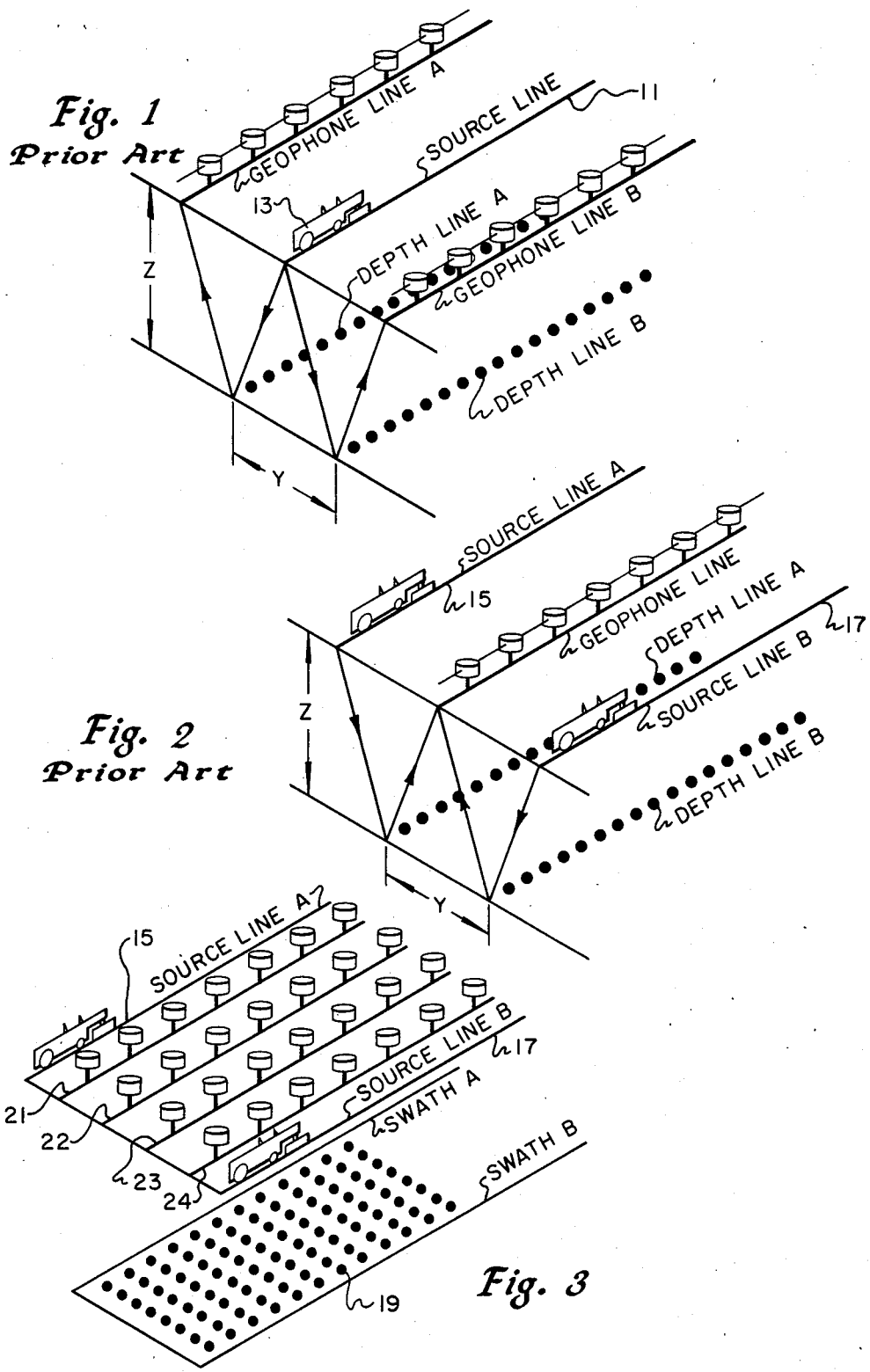

METHOD OF SUPPRESSING VIBRATION SEISMIC SIGNAL CORRELATION NOISE

FIELD OF THE INVENTION

This invention pertains to the field of seismic geophysical prospecting. More particularly, it is involved with seismic geophysical prospecting, using a vibratory signal that follows a programmed reference signal in three-dimensional seismic operations; using a plurality of spaced apart seismic sources; and recording into at least one common line of geophones.

Still more particularly, the invention relates to methods of separating, in processing the data, the seismic signals progressing contemporaneously and separately from two simultaneous vibrating seismic sources at spaced apart points to common receivers.

DESCRIPTION OF THE PRIOR ART

The prior art has seen the practice of employing single sources of seismic energy; such as, exploding dynamite, exploding sodium nitrate in diesel oil; and transmitting, or radiating, seismic signals into a subterranean formation. These signals may reflect from reflecting strata back to individual geophones back at the surface or into geophones in a vertical array, as in a well bore penetrating the subterranean formations. The prior art saw the evolution wherein strings of geophones were laid out in a pattern at one time and the data recorded on each of these geophones then processed by data processing equipment.

This in turn evolved into a plurality, or string of sources on either side of the geophone line, as will become clearer hereinafter from referring to the Figures showing the prior art. Further evolution then had a plurality of lines of sources with a plurality of lines of geophones to get a three-dimensional effect, either with the geophones at the surface or in a well bore. Where a plurality of sources were employed, there was employed and reported in the literature the use of alternate signals which were recorded, as well as simultaneous recording of simultaneous signals. The alternate signals presented no problem in having the respective signals coded into a final recorded signal showing reflected energy from reflecting horizons, or strata, in the subterranean formation. A variety of ways was tried to recover the individual signals when simultaneous signals sourcing was employed. This ranged from the polarity coding, such as disclosed in the prior art and in patents such as U.S. Pat. No. 4,159,463 to the upsweep and downsweep coding of the signals, such as disclosed in the prior art publication like "Simultaneous Recording of Several Vibroseis Lines," Robert Garotta, Technical Series, No. 531.83.07, 45th EAEG Meeting, Oslo, Norway, June 14–17, 1983 and 53rd SEG Meeting, Las Vegas, U.S.A., Sept. 11–15, 1983. Moreover, the latter publication described the simultaneous recording using both the polarity coding and the upsweep and downsweep coding of signals.

In the hereinbefore U.S. Pat. No. 4,159,463, there was disclosed the Silverman U.S. Pat. No. 3,984,805 employing non-synchronized, non-phase-control spaced-apart vibrators and separating the seismic components and the received signal on the basis of a correlation with the separate reference signals. There was also disclosed the Anstey et al. U.S. Pat. No. 3,885,225, which describes employing separate reference signals and separate frequency bands and separating the signal components in the received signals on the basis of correlation with the corresponding reference signals.

Despite employing this advanced technology, there was still correlation noise in the signals when the respective signals were attempted to be separated and it was desirable to attenuate this correlation noise more than had been possible in the prior art approaches.

SUMMARY OF THE INVENTION

Accordingly, it is an object of this invention to provide a method of employing simultaneous signal input from a plurality of sources, common geophones and recording; yet recovering individual signal records and attenuating correlation noise in the recovered signals in making a three-dimensional seismic survey.

It is a specific object of this invention to provide a method of seismic processing in which simultaneous seismic signal generation is employed and in which the recorded signals are separated to produce individual records of comparable quality to that available through alternate generation of and recording of received seismic signals, instead of simultaneous generation, and in which correlation noise is attenuated compared to the prior art processes.

These and other objects will be come apparent from the descriptive matter hereinafter, particularly when taken into conjunction with the appended drawings.

In accordance with this invention, there is provided a method of seismic prospecting in which a plurality of seismic vibrating sources at a plurality of spaced source points contemporaneously radiate seismic signals into the earth, each source being responsive to an individual reference signal. The seismic signals travel by different paths to a plurality of spaced-apart receivers, forming at each receiver respective complete recorded signal record. The method comprises the steps of generating a first signal of a first polarity and first directional sweep over a first predetermined frequency range; generating a second signal of a second and opposite polarity to the first polarity and second directional sweep opposite the first directional sweep over a second predetermined frequency range, which may be the same as or different from the first predetermined frequency range; determining the common frequency of the first and second directional sweeps at a common time into their respective sweep patterns; introducing alternately into first one and then the other of the first and second signals a taper at which the common frequency is reduced to zero; recording returned, or reflected portions of the first and second signals to form respective recorded signals; separating the respective recorded signals into respective first signals and second signals to form first recorded complete signals and second recorded complete signals and inverse filtering the first and second recorded signals to recover information lost by the tapers. Conventional data processing can be employed on the recorded signals as desired.

BRIEF DESCRIPTION OF THE DRAWINGS

FIG. 1 is a schematic illustration of a multi-line of geophones forming a two-dimensional survey in accordance with the prior art.

FIG. 2 is a schematic illustration of a multi-source method of forming a two-dimensional survey in accordance with the prior art.

FIG. 3 is a schematic illustration of a multi-source, multi-line method of forming a three-dimensional survey, employable in accordance with this invention, as well as the prior art.

FIG. 7b is a schematic illustration of a response signal generated by an input signal such as illustrated in FIG. 7a.

Figure 11A:
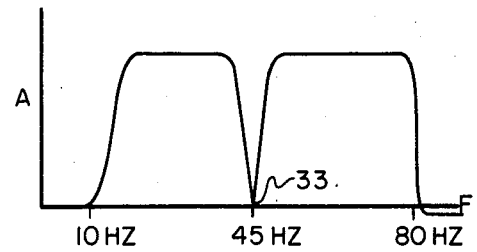
Figure 10B:
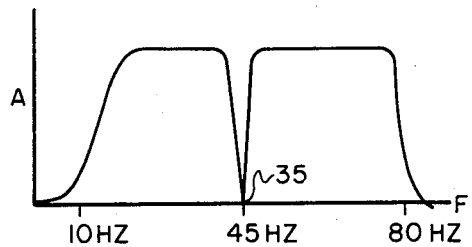

Similarly, FIGS. 11a, b, and c represent plots of a first signal having a taper, second signal without a taper and a composite signal.

Figure 12A:
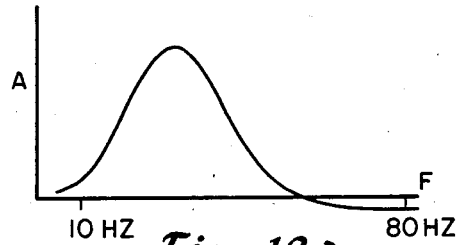

FIGS. 12a and b illustrate a loss in signal information and the recovery of a substantial part of that information through inverse filtering, or deconvolution.

DESCRIPTION OF PREFERRED EMBODIMENT(S)

This invention may be more clearly understood by referring to the Figures. As illustrated in FIG. 1, a two-dimensional survey along depth lines A and B for predetermined depth. Specifically, a single source line 11 is formed by sending seismic signals into the earth for reflecting from reflecting strata by one or more sources 13 sending the signals along the line 11. As indicated hereinbefore, the sources may comprise any conventional source; such as, a plurality of charges of dynamite, nitrate and oil, or the like. A particularly good source has been found to be the Vibroseis, a trademark of Conoco in which a vibrating weight imparts energy with particular phase and frequency relationships. Specifically, the equipment causes the vibrator to strike the earth responsive to a reference signal that is programmed into an operational controller. Other sources such as airguns and the like can be employed but the Vibroseis, trademark of Conoco, Inc., is a particularly excellent source because of its programmability and the like.

The geophones are conventional geophones which provide an output signal responsive to relative motion between an armature and an outer shell or winding or similar construction. Each of the geophones then transmits its received signals to a recorder or the like for recording. The recorded signals can then be operated on as desired to obtain the best results. It is readily apparent that the two geophone lines, for two-dimensional surveys will map a line generally half way between the source line and each geophone line; such as, geophone line A or geophone line B.

Similarly, in FIG. 2, the depth lines A and B are mapped in the two-dimensional survey by a single geophone line at the center with a plurality of source lines 15, 17 at the outside of the survey line.

Where a three-dimensional effect is desired, as illustrated in FIG. 3, a plurality of depth points 19 return a portion of the signal from respective source lines 15, 17 to the geophones in the geophone lines 21–24. In three-dimensional seismic logging the distance between depth point lines is relatively small compared to the depth of the target. For this reason, multi-line or multi-source recording is preferred for three-dimensional acquisition. Of course, a single source line can be employed with a plurality of geophone lines if desired for three-dimensional logging. If desired, a plurality such as four parallel geophone lines can be employed but when the survey is along a line longer than the width, the geophones have to be picked up then laid down again in order to record. Consequently, multi-line recording with all the geophones laid out is preferred. In this case, where source lines A and B have to be recorded anyway, multi-source recording is more effective and speeds up the operation. FIG. 3 illustrates providing multiple coverage in the direction of acquisition and single coverage in the perpendicular direction. It is also possible to use source lines perpendicular to the geophone lines so as to obtain multiple coverage in both directions if desired.

Multisource recording can be performed in different ways. It is possible to record sequentially from line A and then from line B. It also is possible to record alternately. However, as the vibration time is an important factor in the total cost of such a survey it is desirable to optimize the survey. Expressed otherwise, for a multisource alternate recording the vibration time of one set is used while the other set is moved if a single source is employed along each line. For example, source A may start first, its vibration time plus the time for listening to the pattern is somewhat extended. The source is put along source line B and then location B starts vibrating and its listening time and vibrating time become additive. During the time of listening for source B, source A is moved. This situation in which vibration plus listening times is equal to the moving time provides the optimum use of two sets of vibrators because neither is waiting for the other at any one time.

When there is more than one location or component for a vibration point, the alternate mode requires separate storage of individual records or partial stacks for locations A and B. The total capacity of the memory is doubled and divided between blocks A and B which prevents mixing the data from the two different sources and allows the two blocks to be transferred onto tape sequentially.

If large areas are desired to be explored geophysically, the alternate method is sometimes inefficient and it becomes desirable to have simultaneous sending of the seismic signals into earth with simultaneous recording. There is more flexibility since vibrating plus listening time does not have to be equal to the moving time. In practice, it is generally greater for surveys requiring an extensive surface effort. In any case, the vibrating point at time index for two sets of vibrators, listening and moving are exactly simultaneous and the record for each of these double locations is a mix of the records that might have been emitted separately from A and B.

Some additional processing is thus necessary to recover the individual records. The additional processing can be done either in the field or with additional hardware or in processing centers. In some cases, partial stacks have to be preserved.

One aspect which has been useful in helping with separation is coding. A first coding condition may concern the frequency spectra of two sequences which must be identical to preserve aquisition homogeneity. The second expresses non-correlation of the two sequences which must be respected to avoid spurious energy from other sources on each individual signal.

There are a number of ways to satisfy these conditions. Two of them which are easily carried out are polarity coding and up and down coding, commonly referred to as upsweep and downsweep.

Figure 6:
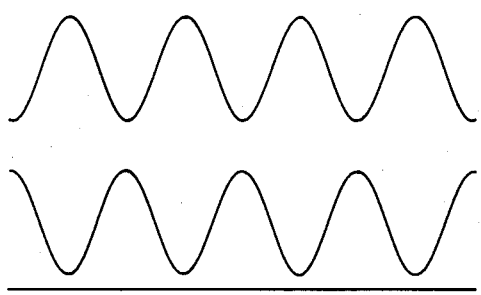
FIG. 6 is a schematic illustration of a typical opposed polarity coding approach for recovering signals.

Polarity coding is illustrated in FIG. 6. The signals are exactly out of phase and, since they are the same, they would cancel or go to zero if added and if the physical signal was exactly the same as the theoretical signal. In practice this is not the case and so polarity coding results, as reported in the literature, in a recovery with only a minus 30 db (decibel) attenuation in the residual signal from the other vibrator set. This is normally considered as noise to the desired signals.

Similarly, the upsweep and downsweep coding has been tested in the field; and it has been found that around minus 35 decibel (dB) attenuation of the possible remaining residual from the other vibration set signals is achieved.

It is relatively straightforward to use preset correlation techniques and both polarity coding and up and down coding. The results of this is to achieve better than minus 60 decibel residual remaining from the other vibrator set when the records are separated.

Figure 5:
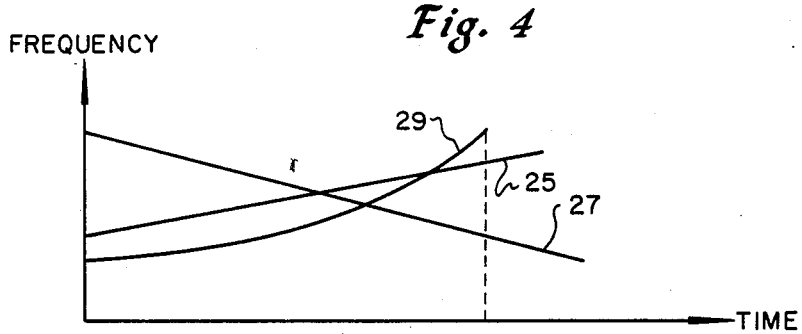
FIG. 5 is a schematic illustration of a plot of frequency versus time for the respective types of vibratory seismic signals ranges having both upsweep and downsweep characteristics on the respective signal plots.
Figure 7A:
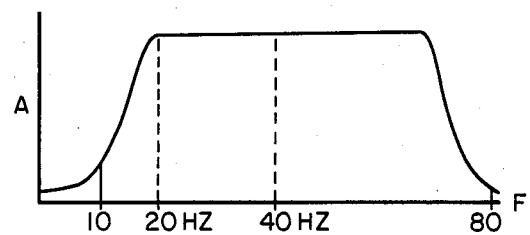
FIG. 7a is a plot of amplitude versus frequency for a typical seismic generation between 80 Hertz and 10 Hertz.
Figure 7B:
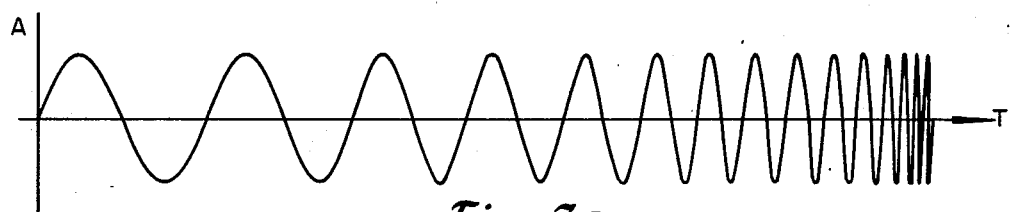
Figure 8A:
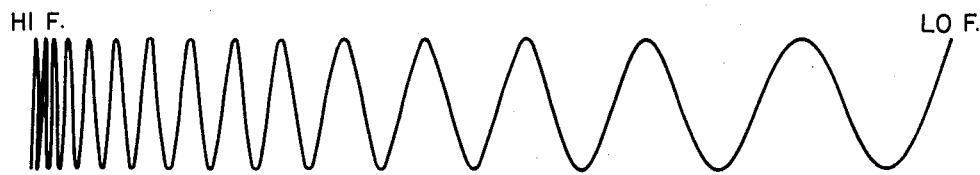
FIG. 8a is a schematic illustration of a downsweep in which the frequency starts out at a higher frequency and decreases to a lower frequency.
Figure 8B:
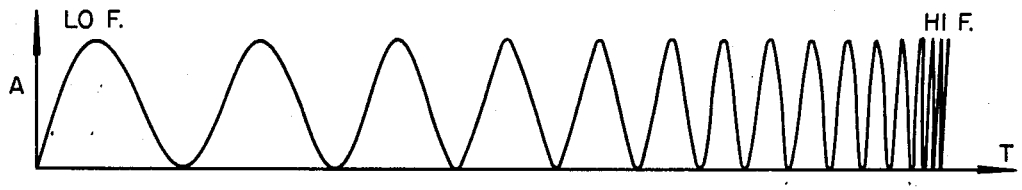
FIG. 8b is the converse, or upsweep, in which the signal starts out at a low frequency and increases to a high frequency for the particular seismic source being employed.

The up and down coding, upsweep and downsweep, can be understood by referring to FIGS. 5, 7a, 7b, 8a, 8b. Specifically, the plot of frequency versus time for the respective signals will have a curve ranging from a straight line to a curved function such as illustrated in FIG. 5. For example, a straight upsweep is illustrated by the line 25. On the other hand a downsweep is illustrated by the line 27 and a non-linear sweep with increasing frequency is illustrated by the curved line 29. In FIG. 7a there is illustrated the plot of amplitude A versus frequency. In the illustrated embodiment the frequencies vary between 10 and 80 Hertz (cycles per second) as an illustration. The received signal is illustrated in FIG. 7b. FIG. 8a illustrates a theoretical type downsweep in which you go from a high frequency of for example about 80 Hertz down to about 10 Hertz. Conversely, FIG. 8b represents the going from a low frequency of about 10 Hertz to about 80 Hertz.

Figure 4:
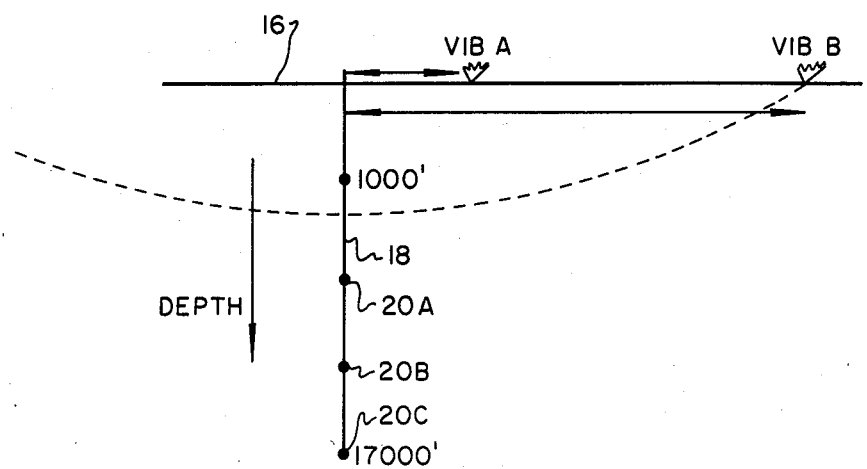
FIG. 4 is a schematic illustration of a vertical seismic profiling method employing a plurality of vibratory seismic sources, employable in this invention.

This invention is also useful in vertical seismic profiling, such as illustrated in FIG. 4. In FIG. 4, the sources such as vibrators A and B will send out the seismic signals which travel through the earth's formations and are picked up at a plurality of geophone locations 20a, 20b and 20c that are disposed in a wellbore 18 penetrating the subterranean formations that are the surface 16 of the earth.

Figure 9:
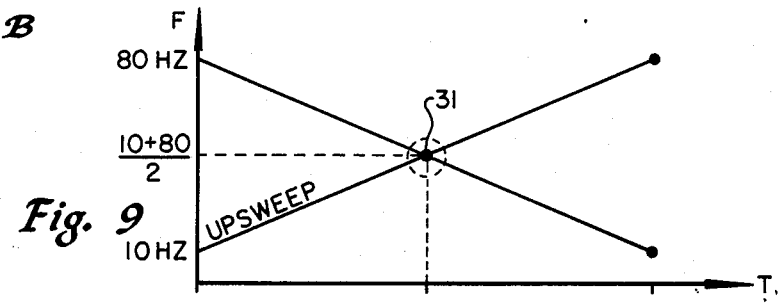
FIG. 9 is a specific plot of a linear upsweep and downsweep from 10 to 80 Hertz, illustrating that the predominant frequency which can be reduced to reduce the most significant part of the correlation noise that distorts the desired zero phase Klauder wavelet.
Figure 10A:
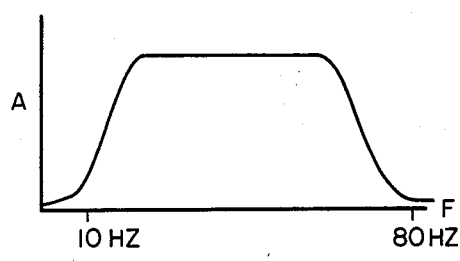
FIGS. 10a, b, and c, illustrate respectively, plots of the first signal without a taper, second signal having a taper at the predominant frequency and a composite signal achieved from a combination of the two.
Figure 11B:
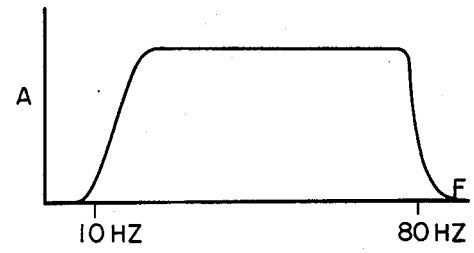
Figure 10C:
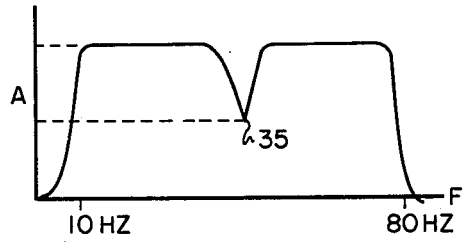
Figure 11C:
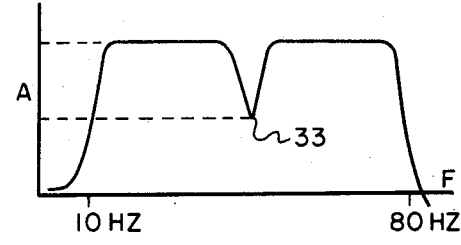
Figure 12B:
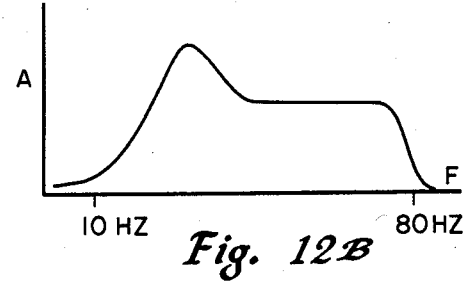

The step of determining the common frequency of the first and second directional sweeps at a common time into their respective sweep patterns can be understood by referring to FIG. 9. Therein, the frequency is plotted as the ordinate and time is plotted as the abscissa. In the illustrated plot, the frequency increases from 10 to 80 Hertz on the upsweep and decreases from 80 Hertz to 10 Hertz on the downsweep. Where the curves cross at point 31, there is a frequency that is dominant in the correlation noise. The frequency at the crossing of the illustrated linear curve for upsweep and downsweep of 10 to 80 Hertz (as an illustration) is $(10+80) \div 2 = 45$ Hertz. Consequently, this invention has found that this dominant correlation noise is reduced by reducing the signals having a frequency of 45 Hertz. This, in turn, reduces the noise in the recovered records when the method of this invention is carried out. It is theorized that this reduces the noise that is the most significant part of the correlation noise that distorts the desired zero-phase Klauder wavelet. Regardless of whether this theory is correct or not, it is a proven fact that the noise of the recovered signals is reduced when the method of this invention is employed. This is seen in practical application in FIGS. 10a–c and 11a–c. Specifically, the vibrator A sweeping from 10 to 80 Hertz in a first polarity and sweeping forwardly has its full frequency spectrum. Simultaneously, vibrator B sweeping from 80 Hertz down to 10 Hertz has its downsweep spectrum interrupted by the taper 33 at the common frequency of about 45 Hertz. Conversely, on the second sweep, vibrator A is programmed to have the taper 35 at the mid point of about 45 Hertz in the 10 to 80 Hertz upsweep, while, as shown in FIG. 11b vibrator B employs the full frequency spectrum in its downsweep from 80 Hertz to 10 Hertz. Resultant signals, as seen in FIGS. 10c and 11c show a frequency in which the tapers 33 and 35 are reduced in their total impact so as to reduce the correlation noise, yet allow useful information to be recovered about the formation by signals at this frequency, particularly when inverse filtering is applied later. Specifically, as illustrated in FIGS. 12a and 12b, the loss in information is recovered by inverse filtering so any adverse effects of the taper are neutralized by the inverse filtering step in accordance with the method of this invention.

A computer printout illustrates the correlated wavelet that would result without the proposed tapering technique. The computer printout shows non-symmetry of the results in wavelet; whereas, another printout employing the tapering technique with the frequency taper shows a symmetrical wave without significant distortion from correlation noise over the time breadth of the wavelet. Yet, actual test data shows the minus 6 dB (decibel) drop at the mid-band frequency point employing a linear sweep and taper, can be recovered by the process of inverse filtering commonly used in data processing.

Such computer printouts show the vibrators can even deviate from being perfectly synchronized as is common practice in reality and the correlation noise distortion be removed by the method of this invention.

Table 1 shows values of a correlated wavelet without mid-band frequency taper, as described hereinbefore, and showing unsymmetrical results. Conversely, Table 2 shows the correlated wavelet with the mid-band frequency taper, as shown from a computer printout as described above. As can be seen, there is symmetry in Table 2. In the tables the column labeled "Sig. I.D." is with the signal identification whereas the value of the wavelet is shown under column heading "Value."

In operation, at least a pair of seismic sources such as the vibroseis, or vibrational seismic sources A and B send their seismic signals into the earth along respective lines as illustrated in FIG. 3. The respective signals are bounced off points on a reflecting strata and the reflected signals are received by geophones in the geophone lines 21-24. The respective first and second signals are sent simultaneously and their reflected information recorded simultaneously. Thereafter the common frequency is determined. For example, the common frequency for linear upsweep and linear downsweep between 10 and 80 Hertz would be at 45 Hertz. Accordingly, the vibrational seismic signal generators A and B are programmed to put in a taper at the 45 signal frequency on respective runs, as illustrated in FIGS. 9, 10a-c and 11a-c. The reflected signals are recorded such that the alternately introduced tapers do not have a dominant frequency correlation noise at the common frequency shown in FIG. 9.

TABLE I

| Sig. i.d. | Value | | |
|---|---|---|---|
| 1012 | −25.843 | | |
| 1013 | −36.055 | | |
| 1014 | −23.018 | | |
| 1015 | −33.812 | | |
| 1016 | −18.929 | | |
| 1017 | −27.977 | | |
| 1018 | −31.267 | | |
| 1019 | −16.926 | | |
| 1020 | −16.550 | | |
| 1021 | −33.744 | | |
| 1022 | −11.051 | | |
| 1023 | −8.3949 | | |
| 1024 | −7.9190 | ↑ | |
| 1025 | .00000 | | —unsymmetrical |
| 1026 | −8.8431 | ↓ | |
| 1027 | −7.6396 | | |
| 1028 | −11.404 | | |
| 1029 | −32.534 | | |
| 1030 | −18.253 | | |
| 1031 | −15.691 | | |
| 1032 | −34.959 | | |
| 1033 | −24.938 | | |
| 1034 | −21.733 | | |
| 1035 | −23.885 | | |
| 1036 | −22.337 | | |

TABLE II

| Sig. i.d. | Value | | |
|---|---|---|---|
| 1008 | −30.174 | | |
| 1009 | −48.221 | | |
| 1010 | −33.448 | | |
| 1011 | −18.496 | | |
| 1012 | −23.600 | | |
| 1013 | −28.613 | | |
| 1014 | −35.763 | | |
| 1015 | −31.918 | | |
| 1016 | −24.863 | | |
| 1017 | −40.785 | | |
| 1018 | −40.729 | | |
| 1019 | −13.068 | | |
| 1020 | −14.023 | | |
| 1021 | −36.904 | | |
| 1022 | −12.853 | | |
| 1023 | −8.3709 | | |
| 1024 | −8.4372 | ↑ | |
| 1025 | −.00000 | | —symmetrical |
| 1026 | −8.4372 | ↓ | |
| 1027 | −8.3709 | | |
| 1028 | −12.853 | | |
| 1029 | −36.904 | | |
| 1030 | −14.023 | | |
| 1031 | −13.068 | | |
| 1032 | −40.729 | | |
| 1033 | −40.785 | | |
| 1034 | −24.863 | | |
| 1035 | −31.918 | | |

TABLE II-continued

| Sig. i.d. | Value |
|---|---|
| 1036 | −35.763 |
| 1037 | −28.613 |
| 1038 | −23.600 |
| 1039 | −18.496 |
| 1040 | −33.448 |

Thereafter, the respective recorded signals of the respective first and second signals can be separated.

Any loss of information because of the taper in the signals is recovered by inverse filtering in conventional data processing.

Employing the method of this invention, the respective individual signals are recovered without significant correlation noise and, in fact, the recovered signals are almost indistinguishable from the individual records achieved from the same three-dimensional survey employing alternate seismic signal generating and recording.

Thus from the foregoing it can be seen that the objects of this invention are achieved.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A method of seismic prospecting in which a plurality of seismic vibrating sources at a plurality of spaced source points contemporaneously radiate seismic signals into the earth, each source being responsive to an individual reference signal, the seismic signals traveling by different paths to a plurality of receivers in forming at each receiver a respective complete recorded signal comprising the steps of:
   a. generating a first signal of a first polarity and a first directional sweep over a first predetermined frequency range;
   b. generating a second signal of a second and reverse polarity to said first polarity and second directional sweep opposite said first directional sweep over a second predetermined frequency range;
   c. determining the common frequency of said first and second directional sweeps at a common time into their respective sweep patterns;
   d. introducing alternately into first one and then the other of said first and second signals a taper at which said common frequency is reduced to zero;
   e. recording returned portions of said first and second signals to form respective recorded signals;
   f. separating the respective recorded signals into respective first signals and second signals to form first recorded complete signals and second recorded complete signals; and
   g. inverse filtering said respective said first and second recorded signals to recover information attenuated by said tapers.

2. The method of claim 1 wherein said first frequency range equals said second frequency range.

3. The method of claim 2 wherein said directional sweeps are respective linear upsweep and linear downsweep and said common frequency is equal $(f1+f2)\div 2$.

4. The method of claim 1 wherein said directional sweeps are substantially linear.

5. The method of claim 1 wherein said direction sweeps are nonlinear.

* * * * *